United States Patent [19]

Hibbert

[11] Patent Number: 4,929,801

[45] Date of Patent: May 29, 1990

[54] THERMALLY EFFICIENT VENTILATED ELECTRIC BUSWAY SYSTEM

[75] Inventor: David A. Hibbert, South Windsor, Conn.

[73] Assignee: General Electric Company, New York, N.Y.

[21] Appl. No.: 400,904

[22] Filed: Aug. 30, 1989

[51] Int. Cl.$^5$ .......................... H02G 5/06; H02G 5/10
[52] U.S. Cl. ..................................... 174/16.2; 174/68.2
[58] Field of Search ............................... 174/16.2, 68.2

[56] References Cited

U.S. PATENT DOCUMENTS

| | | | |
|---|---|---|---|
| 2,057,266 | 10/1936 | Rippere | 174/16.2 X |
| 2,138,617 | 11/1938 | Scott, Jr. | 174/16.2 X |
| 3,354,261 | 11/1967 | Polgov | 174/16.2 X |
| 4,804,804 | 2/1989 | Hibbert et al. | 174/16.2 |

*Primary Examiner*—Laramie E. Askin
*Attorney, Agent, or Firm*—Richard A. Menelly; Walter C. Bernkopf; Fred Jacob

[57] ABSTRACT

An electric busway system consists of a plurality of planar bus bars insulated from each other and bolted together for good mechanical strength and for efficient thermal conductivity. The bus bars are additionally perforated to promote convective air current flow through the perforations when the bus bars are mounted in the horizontal plane.

3 Claims, 3 Drawing Sheets

4,929,801

THERMALLY EFFICIENT VENTILATED ELECTRIC BUSWAY SYSTEM

BACKGROUND OF THE INVENTION

U.S. Pat. No. 4,804,804 entitled "Thermally Efficient Power Busway Housing" describes a plurality of planar copper or aluminum bus bars insulated from each other by means of an epoxy coating and bolted together to promote transfer of heat from inside the bus bars to the outside of the housing. One embodiment includes the use of a channeled bolt to promote the flow of air through the interior of the bus bars and thereby increase their ampacity without a corresponding increase in heat. When such bus bars are subjected to high ampere loadings, however, the magnetic repulsion forces generated between the individual bus bars require the use of larger bolts to resist distortion of the bus bars while maintaining the size of the air passage channel and accordingly increases the overall cost of the busway system.

In industrial installations, where the bus bars are often arranged in the horizontal plane, the ambient air becomes trapped under the bus bars to thereby increase the operating temperature of the bus bars several degrees Celsius above ambient.

One purpose of the instant invention is to provide a thermally efficient power busway system having improved thermal properties to thereby allow the bus bars to be mounted in either the horizontal or vertical plane without adding to the overall cost of the busway system.

SUMMARY OF THE INVENTION

The invention comprises a plurality of apertured electrical bus bars and housing side plates that are bolted together and electrically insulated from each other. The apertures provide a path for convective air flow for cooling the interior of the bus bars when arranged in the horizontal plane. Every other aperture receives the insulated bolts that hold the bus bars and housing side plates together. Additionally, the apertures can be sized to correspond to the ampere ratings of the bus bars.

DESCRIPTION OF THE PREFERRED EMBODIMENT

Figure 1:
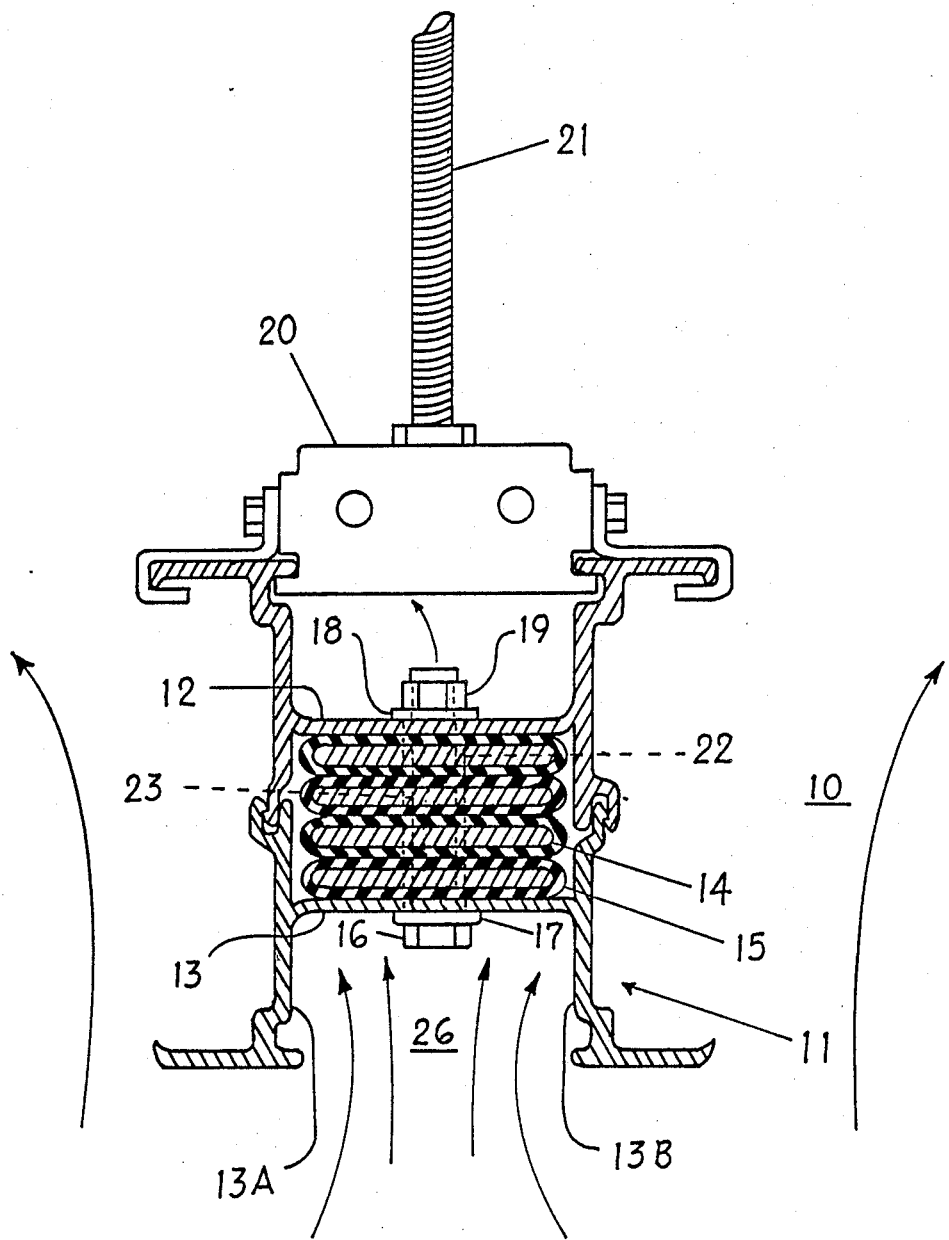
FIG. 1 is a sectioned end view of a prior art busway system employing ventilation cooling.

Before describing the thermally efficient ventilated busway system of the invention, it is helpful to review the thermally efficient busway system described within aforementioned U.S. Pat. No. 4,804,804, which Patent is incorporated herein for reference purposes, an example of which is depicted at 10 in FIG. 1 to consist of a housing arrangement 11 consisting of a pair of opposing aluminum side plates 12, 13 and a plurality of copper or aluminum bus bars as generally indicated at 14. The bus bars are electrically insulated from each other as well as from the housing side plates by means of an epoxy coating 15. The epoxy is selected for its high electrical resistivity along with its high thermal conductivity. The bus bars and the housing side plates are tightly held together by means of an insulated bolt 16 that traverses through the apertures 22 formed through the bus bars and the side plates. A pair of washers 17, 18 and a nut 19 hold the insulated bolt tightly against the bus bars and the side plates. When the busway system is arranged in the horizontal plane as depicted in FIG. 1, and the housing is attached to a factory ceiling by means of the post 21 and hanger 20, the area beneath the bus bars and between the sidewall extensions 13A, 13B as defined generally at 26, is found to increase in temperature by creation of a so-called "dead air" space. The aperture 23 through the insulated bolt provides cooling to the busway system by the so-called "chimney effect" to some extent. However, the size of the aperture relative to the bolt diameter is small in order to enhance the structural properties of the bolt. The temperature rise within the dead air space can, in some instances, approach ten degrees Celsius above ambient. When the busway system traverses a hot air inlet or is arranged in a corner of the factory ceiling, this temperature can rise even higher.

Figure 2:
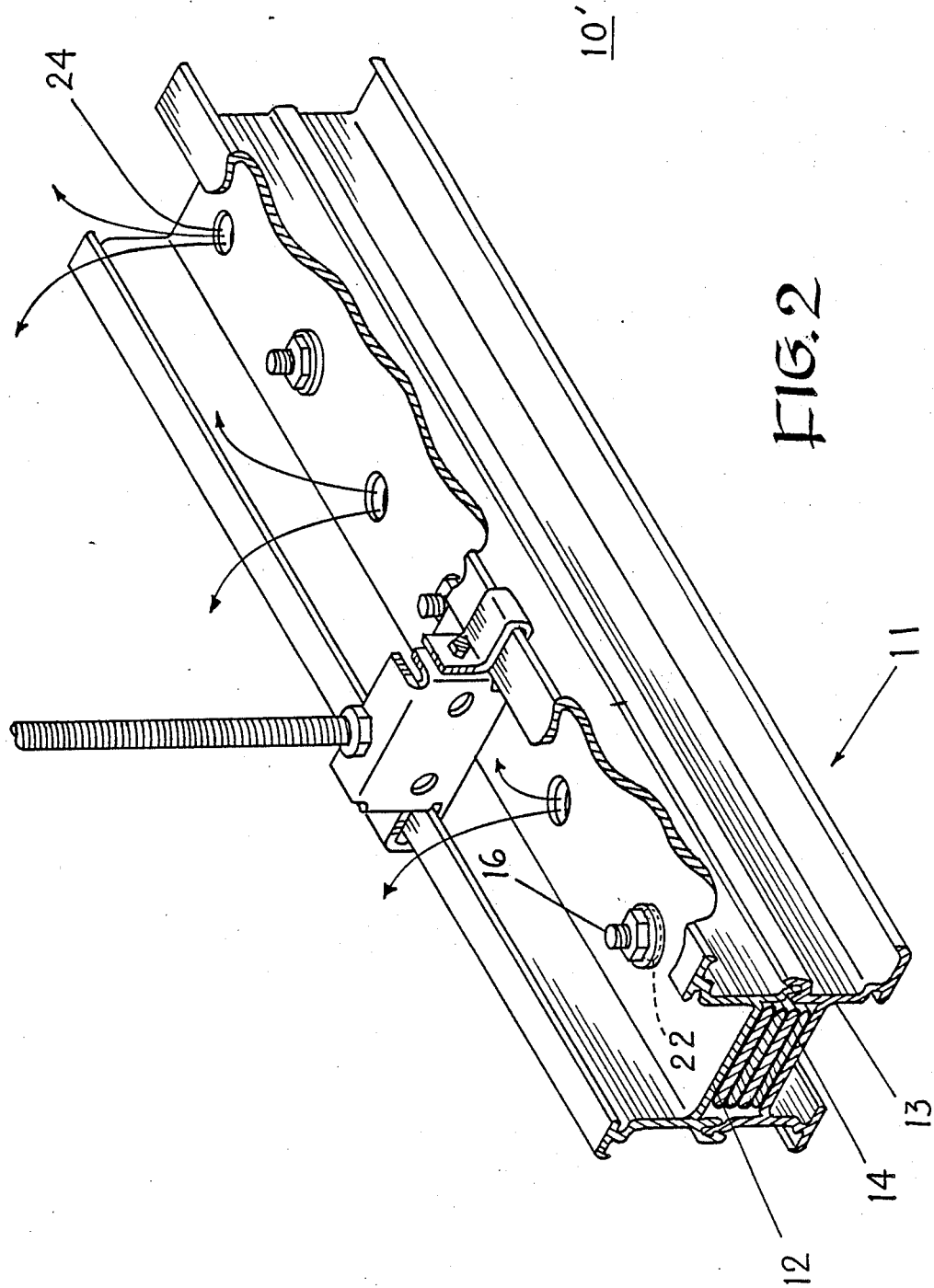
FIG. 2 is a top perspective view of the ventilated busway system according to the invention.

In order to reduce the bus bar temperature, the ventilated busway system 10' of FIG. 2 includes a plurality of additional apertures 24 aligned with and intermittent to the apertures 22 that receive the bolts 16 that attach the bus bars 14 to the side plates 12, 13. For purposes of economy and ease in manufacture, the apertures are used both for containing the insulated bolts 16 as well as for ventilation cooling.

Figure 3:
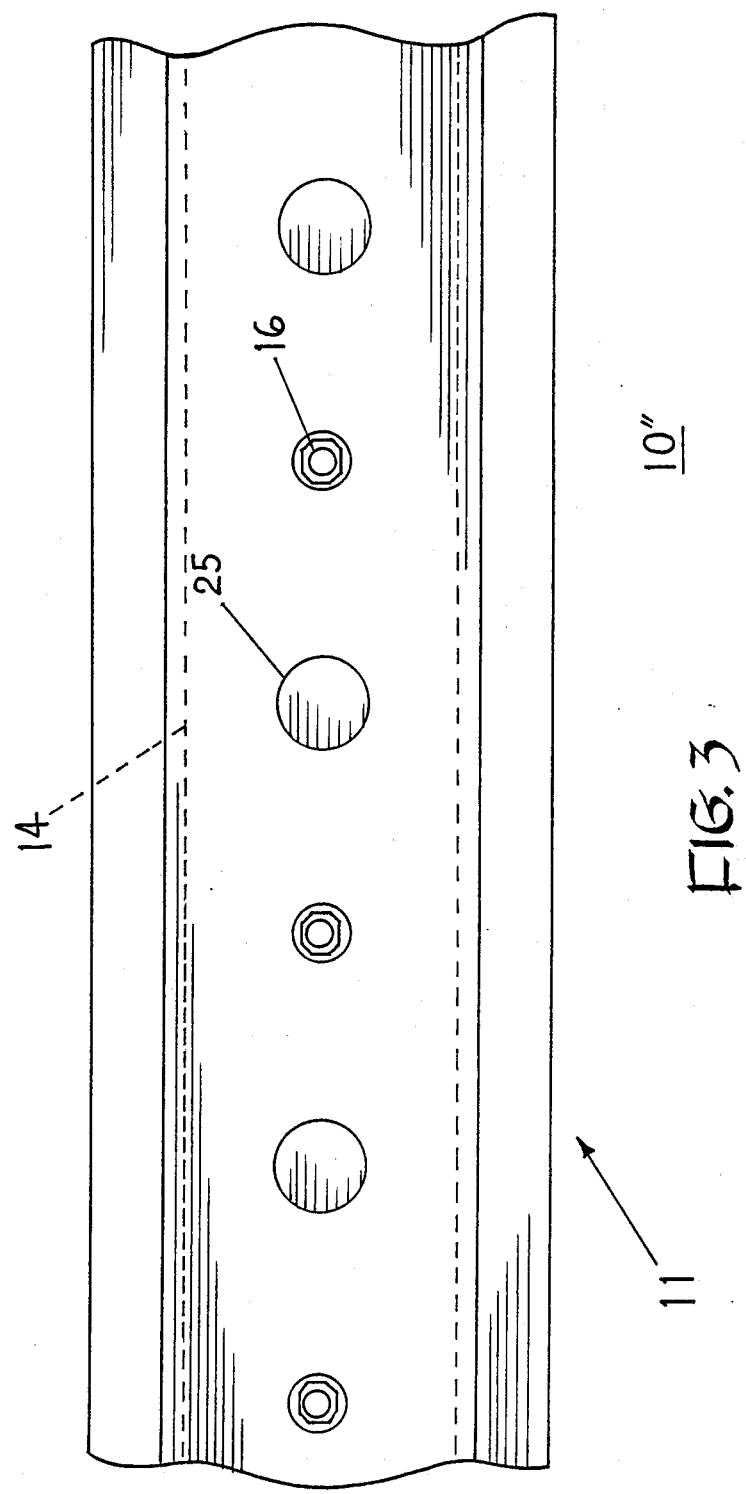
FIG. 3 is a top plan view of an alternate embodiment of the ventilated busway system of FIG. 2.

For higher-rated industrial power distribution systems, the busway system 10" of FIG. 3 can be employed. In this arrangement, the additional apertures 25 through the bus bars 14 and housing 11 are larger than those employed with the insulated bolts 16. It is believed that the larger apertures besides promoting convection cooling through the bus bars and housing, also reduce the overall weight load of the busway system by removing large quantities of the copper or aluminum material used to form the bus bars 14 along with the aluminum used to form the housing 11.

A thermally efficient ventilated busway system has herein been described for horizontally-mounted industrial power distribution systems. The ventilated busway system can also be employed within vertically-mounted industrial power distribution systems when higher-rated currents are anticipated without increasing the overall temperature of the bus bars, per se.

It has been discovered, in contrast to the prior art practice of increasing the amount of the material to increase the ampere rating of bus bars, that removal of some copper material in accordance with the teachings of this invention actually allows the rating to be increased. The material removed to form the bolt and thermal transport apertures during the manufacturing process is reclaimed and recast into bus bars for substantial cost savings.

I claim:

1. Electric power busway comprising:
a pair of opposing side rail supports;
a plurality of planar bus bars intermediate said side rail supports, said bus bars having a first plurality of longitudinally spaced apertures, each aperture of said first plurality of apertures receiving an insulated bolt holding said bus bars fixedly to said support and said bus bars having a second plurality of longitudinally spaced apertures, said apertures of said second plurality of apertures being unobstructed providing airways for passage of cooling air through said bus bars,
wherein said apertures of said first plurality of apertures have a first diameter and said apertures of said second plurality of apertures have a second diameter larger than said first diameter.

2. The electric power busway of claim 1 wherein said bus bars and said side rail supports are suspended from a ceiling, said bus bars and said side rail supports being arranged in a plane parallel to said ceiling.

3. The electric power busway of claim 1 wherein said bus bars and said side rail supports are suspended from a ceiling, said bus bars and said side rail supports being arranged in a plane perpendicular to said ceiling.

* * * * *